No. 862,570.
PATENTED AUG. 6, 1907.
E. MacDONALD.
SINK STRAINER.
APPLICATION FILED JAN. 17, 1906.
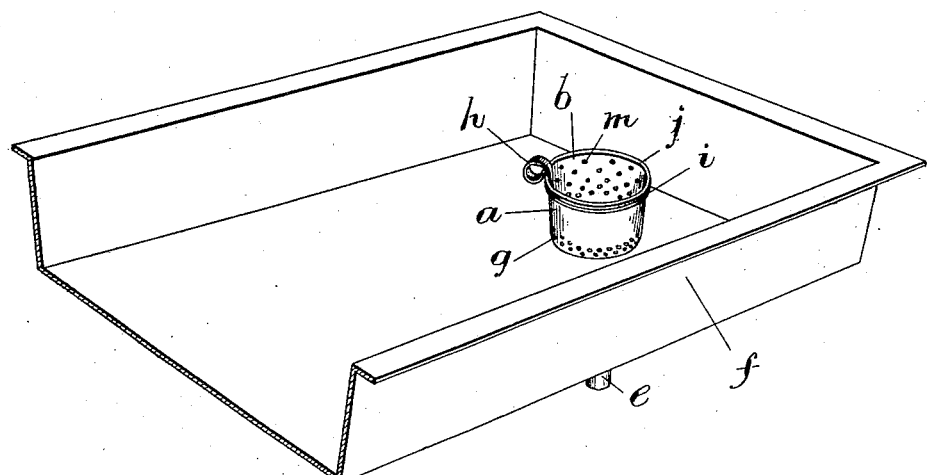
Fig.1
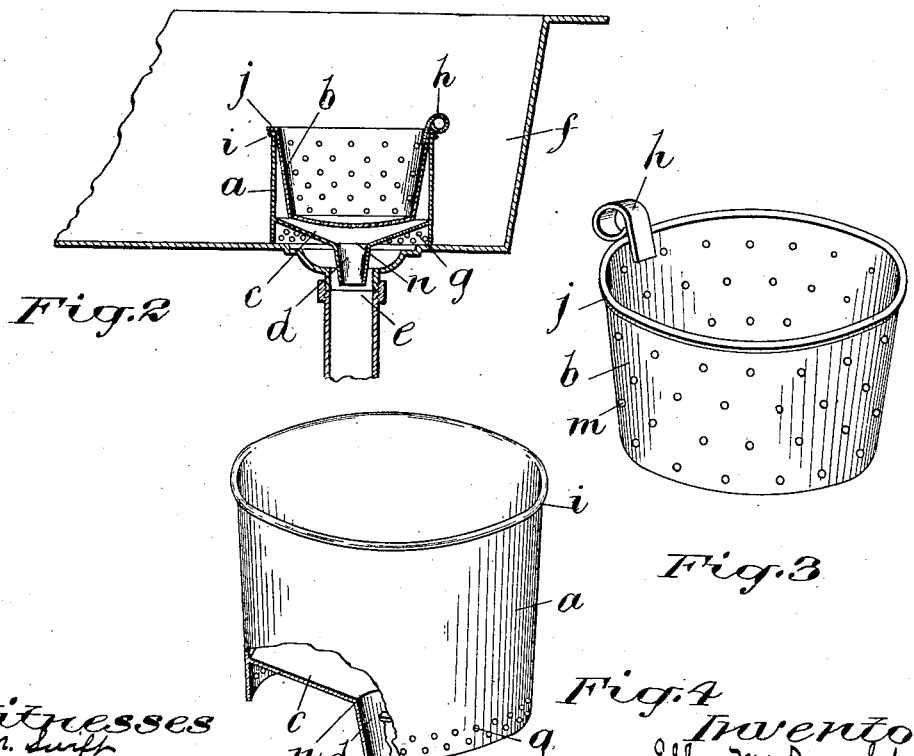
Fig.2
Fig.3
Fig.4
Witnesses
M. M. Swift
Alex. D. Wilson
Inventor
Ellen MacDonald
by Smith & Damun
attorneys

UNITED STATES PATENT OFFICE.

ELLEN MacDONALD, OF ORANGEVILLE, ONTARIO, CANADA.

SINK-STRAINER.

No. 862,570.  Specification of Letters Patent.  Patented Aug. 6, 1907.

Application filed January 17, 1906. Serial No. 296,502.

*To all whom it may concern:*

Be it known that I, ELLEN MACDONALD, a subject of the King of Great Britain, residing at Orangeville, in the county of Dufferin, in the Province of Ontario, Canada, have invented a new and useful Improvement in Sink-Strainers, of which the following is a specification.

My invention relates to a device adapted to be arranged in a sink, and in connection with the waste-pipe from the sink; whereby slops and waste matters may be thrown or poured into the device, and the liquids strain therethrough, and the solid matters be retained, and prevented from getting into the waste-pipe.

The device comprises in its construction, a casing adapted to set in the sink over the waste-pipe strainer, and support a straining vessel similar to a colander, and adapted to be removed from the casing and used as such if required. The casing is constructed with a converging bottom terminating in a spout adapted to pass through a circular opening in the center of the waste-pipe strainer, or the waste-pipe strainer may be removed, and the spout allowed to fit into the waste-pipe. The casing will be provided with a series of perforations formed around its lower edge, to allow the liquids from the sink to pass into the waste-pipe. I attain these objects by my device as illustrated in the accompanying drawings—in which Figure 1 is a perspective view of a section of a sink with the strainer in position; Fig. 2 is a sectional elevation through the strainer and a section of a sink; and Figs. 3 and 4 are perspective views of the parts separated.

Like letters refer to like parts throughout the specification and drawings.

The device consists essentially of two parts, the casing $a$, and the removable strainer part $b$.

Arranged in the lower part of the casing $a$ is a bottom $c$, converging to a point in alinement with the bottom edge of the casing, and formed in the bottom $c$ is a drip-spout $d$, adapted to extend into the drip-pipe $e$, of the sink $f$.

In placing the device in position, the waste-pipe strainer is removed from the sink to allow the spout $d$ to engage and communicate into the waste-pipe.

Formed through the sides of the casing $a$, around the lower edge, are a series of perforations $g$, through which liquids may pass to the waste-pipe when the device is in position in the sink.

Removably fitted into the top of the casing, is the strainer part $b$, which consists of a perforated vessel, provided with a handle $h$, by which it may be removed for emptying or other purposes.

Formed around the upper edge of the casing $a$ is a circular edge $i$, and formed on the upper edge of the removable strainer $b$, is a radial flange $j$. The flange $j$ is adapted to sit on top of the casing $a$ and prevent the strainer $b$ from fitting down too deep into the casing $a$. The sides of the strainer part $b$, will narrow down from the top edge, to allow space between the side of the casing and the strainer, whereby the liquids may pass through the perforations in the sides of the strainer part as well as through the bottom, into the casing.

Slight modifications may be made in the construction and combination of the parts without deviating from the nature of the invention.

I have shown the device circular in construction; but I do not wish to confine myself to shape or form.

When the device is used as a sink strainer and refuse receptacle, the waste matter is poured into the strainer part $b$, and the liquids pass out through the perforations $m$ in the sides and bottom, and escape to the bottom $c$, where it will slide towards and down through the spout into the waste-pipe. When the liquids have been thoroughly drained through the strainer part $b$, and the solid matter has accumulated, and are ready to be removed, the strainer part $b$, is simply lifted out of the casing, without interfering with or removing the casing from its proper position in the sink.

What I claim as new and desire to secure by Letters Patent, is

1. In a sink strainer, a casing, a converging bottom in said casing, an opening through the center of said bottom, a spout formed with said opening, a removable perforated vessel engaging in the upper part of said casing, substantially as specified.

2. In a sink strainer, a casing, a converging bottom in said casing, an opening through the center of said bottom, a spout formed with said opening, a series of perforations formed through the bottom edge of said casing, a removable perforated vessel engaging in the upper part of said casing, a handle formed with the edge of said vessel, substantially as specified.

Signed at Toronto, this 3rd day of January, 1906.

ELLEN MacDONALD.

In the presence of—
   J. N. GORDON,
   M. M. SWIFT.